United States Patent
Nicaise et al.

(10) Patent No.: US 10,875,249 B2
(45) Date of Patent: Dec. 29, 2020

(54) ADDITIVE MANUFACTURING MACHINE COMPRISING AN EXTRACTION SYSTEM AND METHOD OF ADDITIVE MANUFACTURING BY USING SUCH A MACHINE

(71) Applicant: AddUp, Cebazat (FR)

(72) Inventors: Jean-Pierre Nicaise, Cebazat (FR); Gilles Walrand, Cebazat (FR)

(73) Assignee: AddUp, Cebazat (FR)

( * ) Notice: Subject to any disclaimer, the term of this patent is extended or adjusted under 35 U.S.C. 154(b) by 280 days.

(21) Appl. No.: 16/098,729

(22) PCT Filed: May 4, 2017

(86) PCT No.: PCT/EP2017/060643
§ 371 (c)(1),
(2) Date: Nov. 2, 2018

(87) PCT Pub. No.: WO2017/191250
PCT Pub. Date: Nov. 9, 2017

(65) Prior Publication Data
US 2019/0134909 A1 May 9, 2019

(30) Foreign Application Priority Data

May 4, 2016 (FR) ..................... 16 54061

(51) Int. Cl.
*B28B 7/10* (2006.01)
*B28B 13/06* (2006.01)
(Continued)

(52) U.S. Cl.
CPC .......... *B29C 64/379* (2017.08); *B22F 3/1055* (2013.01); *B23K 26/342* (2015.10);
(Continued)

(58) Field of Classification Search
CPC ... B28B 7/0035; B28B 7/0038; B28B 7/0041; B28B 7/10; B28B 13/06; B28B 15/005;
(Continued)

(56) References Cited

U.S. PATENT DOCUMENTS

| 5,597,589 A | 1/1997 | Deckard |
| 5,846,370 A | 12/1998 | O'Connor |

(Continued)

FOREIGN PATENT DOCUMENTS

| DE | 102014112446 A1 | 3/2016 |
| WO | 2014044705 A1 | 3/2014 |

OTHER PUBLICATIONS

Co-pending U.S. Appl. No. 16/065,616, filed Jun. 22, 2018 (available on USPTO system).

(Continued)

*Primary Examiner* — Leo B Tentoni
(74) *Attorney, Agent, or Firm* — Venable LLP

(57) ABSTRACT

A machine (1) for the additive manufacture of a component (2) by complete or partial selective melting of a powder comprises: a working chamber (100); a sleeve (3) having a top opening (4) opening into the working chamber (100), and having a vertical central axis (5), a support plate (6) intended to accept the component (2) in the process of being manufactured, a device (7) for actuating the translational movement of the support plate (6) inside the sleeve (3) along the vertical central axis (5) of the sleeve (3), and a component (2) extraction system (8) comprising a container (9), the extraction system (8) further comprising at least one closure plate (12) that is able to move in order to close the bottom opening (15) of the container (9), and the attachment between the support plate (6) and the actuating device (7) being of the removable type.

11 Claims, 6 Drawing Sheets

(51) Int. Cl.

| | | |
|---|---|---|
| B29C 33/44 | (2006.01) | |
| B29C 41/42 | (2006.01) | |
| B29C 64/379 | (2017.01) | |
| B33Y 10/00 | (2015.01) | |
| B33Y 30/00 | (2015.01) | |
| B29C 64/153 | (2017.01) | |
| B29C 64/35 | (2017.01) | |
| B22F 3/105 | (2006.01) | |
| B29C 37/00 | (2006.01) | |
| B28B 7/00 | (2006.01) | |
| B28B 15/00 | (2006.01) | |
| B29C 64/245 | (2017.01) | |
| B33Y 40/00 | (2020.01) | |
| B23K 26/342 | (2014.01) | |
| B29C 64/20 | (2017.01) | |

(52) U.S. Cl.
CPC .......... *B28B 7/0035* (2013.01); *B28B 7/0038* (2013.01); *B28B 7/0041* (2013.01); *B28B 15/005* (2013.01); *B29C 37/001* (2013.01); *B29C 37/0003* (2013.01); *B29C 37/0007* (2013.01); *B29C 64/153* (2017.08); *B29C 64/20* (2017.08); *B29C 64/245* (2017.08); *B29C 64/35* (2017.08); *B33Y 10/00* (2014.12); *B33Y 30/00* (2014.12); *B33Y 40/00* (2014.12); *B22F 2003/1056* (2013.01); *B22F 2003/1059* (2013.01); *B22F 2999/00* (2013.01); *Y02P 10/25* (2015.11)

(58) Field of Classification Search
CPC . B29C 33/44; B29C 37/0003; B29C 37/0007; B29C 37/001; B29C 41/42; B29C 64/153; B29C 64/245; B29C 64/379; B33Y 10/00; B33Y 30/00; B33Y 40/00
USPC ...... 264/308, 334; 425/375, 436 R, 436 RM, 425/441, 443; 249/74, 136
See application file for complete search history.

(56) References Cited

U.S. PATENT DOCUMENTS

| | | | |
|---|---|---|---|
| 6,932,935 B1* | 8/2005 | Oberhofer | B29C 64/153 425/375 X |
| 7,665,636 B2 | 2/2010 | Ederer et al. | |
| 2001/0045678 A1 | 11/2001 | Kubo et al. | |
| 2006/0175346 A1 | 8/2006 | Ederer et al. | |
| 2012/0090734 A1 | 4/2012 | Heinlen | |
| 2015/0239177 A1 | 8/2015 | Heugel et al. | |
| 2016/0279871 A1* | 9/2016 | Heugel | B29C 64/153 |
| 2017/0246808 A1 | 8/2017 | Hochsmann et al. | |
| 2017/0304897 A1 | 10/2017 | Walrand et al. | |
| 2019/0009334 A1 | 1/2019 | Effernelli et al. | |
| 2019/0009338 A1* | 1/2019 | McMurtry | B29C 64/153 |
| 2019/0039292 A1* | 2/2019 | Abbott | B29C 64/245 |

OTHER PUBLICATIONS

International Search Report dated Jul. 10, 2017, in corresponding PCT/EP2017/060643 (4 pages).

* cited by examiner

ADDITIVE MANUFACTURING MACHINE COMPRISING AN EXTRACTION SYSTEM AND METHOD OF ADDITIVE MANUFACTURING BY USING SUCH A MACHINE

BACKGROUND

The invention relates to the field of what is referred to as additive manufacturing, also commonly referred to as 3-D printing. More specifically, the invention relates in particular to the removal of a component after it has been manufactured using 3-D printing.

3-D printing techniques notably make it possible to manufacture components of complex geometries, that conventional techniques such as moulding, cutting or even extrusion are unable to achieve, or components for which these conventional techniques do not allow the required level of precision to be achieved.

There are a number of additive manufacturing techniques. One widespread technique involves manufacturing a component in successive slices, from a material distributed over a work surface in the form of powder. A first layer of material is distributed over the work surface. An energy source, for example supplied by a laser, allows the slice of the component that is to be manufactured to be solidified within the layer of material. The grains of powder weld together via various physical processes notably dependent on the nature of the material, so as to form continuity within the material. This may for example involve the melting of the grains of powder so that they fuse together. In what follows, all of the physical processes that allow the powder to solidify will be referred to by the expression total or partial melting.

If applicable, the work surface is then lowered by a height corresponding to the height of the next layer. The next layer is then spread out, the next slice is drawn out in this layer, and so on.

Document U.S. Pat. No. 5,597,589 describes an example of the implementation of the above technique. More specifically, according to this example, a manufacturing machine comprises a powder dispenser, in the case in point made of metal, allowing a first portion of powder to be deposited on a target region. A roller allows the powder to be spread if appropriate. A laser beam selectively melts a first layer corresponding to a first slice of the component that is to be manufactured. The process is subsequently repeated layer after layer.

In order to allow the successive formation of the layers of determined thickness, it is known that the work surface is of adjustable height. For that purpose the work surface is formed on a component support platform which is slidably mounted inside a sleeve that forms the manufacturing chamber. The support platform is lowered inside the chamber as the slices of the component that is to be manufactured are gradually formed.

Once the complete component is finished, it therefore rests on the platform, in a lowered position inside the manufacturing chamber, and is smothered in the powder not reached by the energy source.

One problem which then arises is that of extracting the finished component. This is because there is the risk that the powder that has not been exposed to the energy source may spread in the machine, something which is undesirable particularly for machine maintenance reasons, for reasons of controlling the nature of the materials used and for speed of cleaning the machine and getting it back in production.

Document U.S. Pat. No. 5,846,370 proposes removing the manufacturing chamber containing the finished component and the powder from the machine. If appropriate, a cover may be brought over the manufacturing chamber before it is removed so as to prevent the finished component and the powder from being exposed to the air.

Document US 2012/0090734 also proposes extracting the finished component by removing the manufacturing chamber. More specifically, the manufacturing chamber comprises an internal casing housed inside an external casing, the internal casing being removable in relation to the external casing. For that purpose, the external casing is provided with a resealable opening of the hatch type, allowing the internal casing containing the finished component and the remaining powder to be extracted from the external casing and a new internal casing fitted therein.

These two examples have the disadvantages notably of making the structure of the manufacturing machine more complex and of imposing constraints on the manufacturing chamber. Now, the manufacturing chamber may require the installation of temperature control means or of means for controlling the gas surrounding the component. Thus, removing and replacing the manufacturing chamber may prove to be operations which are painstaking and lengthy. The fact that several manufacturing chambers then need to be provided also increases costs.

Document US 2001/0045678 proposes pushing the finished component and the unexposed powder out of the manufacturing chamber in a powder removal section of the machine. The component and the powder then find themselves on a supporting mesh. The powder is detached from the component for example by vibration and is removed through the supporting mesh.

However, this solution assumes that the unexposed powder is compact enough to accompany the component from the manufacturing chamber to the powder removal section, and this places limitations on the materials that can be employed and on the manufacturing conditions.

Document WO 2014/044705 proposes placing a casing over the sleeve, causing the component support platform together with the finished component and the unsolidified powder to be lifted up therein, and closing the casing using the platform.

One disadvantage with this solution is that the working platform needs to be suited to closing the casing, thereby increasing manufacturing costs. In addition, the working platform is an interchangeable component, which means that the costs are multiplied by the number of platforms that need to be held in stock.

Furthermore, during creation of the component, and during the repeated upwards and downwards movements of the platform associated with the manufacturing process, the casing-closure system may become filled with powder or deteriorate, thereby detracting from its function and generating leaks of powder during handling operations.

Therefore there is a need for a new additive manufacturing machine that notably overcomes the above-mentioned disadvantages.

SUMMARY

A first object of the invention is to propose an additive manufacturing machine comprising a system for extracting the finished component without significantly increasing the cost of the device.

A second object of the invention is to propose an additive manufacturing machine comprising a system for extracting the finished component without the need to review the design of the manufacturing device.

A third object of the invention is to propose an additive manufacturing machine comprising a system for extracting the finished component that allows powder that has not been exposed to be removed reliably from the manufacturing device.

A fourth object of the invention is to propose a system for extracting the finished component using a completely external system, the constituent components of which cannot be degraded by the environment and operations involved in the production of the component.

Accordingly, according to a first aspect, the invention provides a machine for the additive manufacture of a component by complete or partial selective melting of a powder. The machine comprises:

a working chamber;

a sleeve having a top opening opening into the working chamber, and having a vertical central axis, a support plate intended to accept the component in the process of being manufactured, a device for actuating the translational movement of the support plate inside the sleeve along the vertical central axis of the sleeve, a component extraction system comprising a container comprising at least one bottom opening towards the top opening of the sleeve, the container being mounted with the ability to move in the working chamber with respect to the sleeve between a standby position in which the container is set away from the opening of the sleeve and an operation position in which the bottom opening of the container at least partially coincides with the top opening of the sleeve.

The support plate is then moved by the actuating device from the sleeve to inside the container in the operation position, and the extraction system further comprises at least one closure plate able to move with respect to the container in the working chamber along at least one horizontal axis in order to close the bottom opening of the container, this closure plate being separate from the support plate. In addition, the attachment between the support plate and the actuating device is of the removable type.

The extraction system can then form an assembly that is independent of the elements involved in the manufacture of the component, which means that it has no impact on the design and operation of those elements.

The machine may exhibit the following additional features, considered alone or in combination:

the container may move between a standby position and an operation position along an input axis parallel to the vertical central axis of the sleeve;

the container may move between a standby position and an operation position along an input axis perpendicular to the vertical central axis of the sleeve;

the container may move between an operation position and an extraction position in which the container is outside of the working chamber;

the actuating device may comprise a piston, the support plate being mounted removably on the piston, the closure plate being interposed between the support plate and the piston to close the bottom opening of the container;

the extraction system comprises a removable coupling device coupling the closure plate and the container;

the extraction system comprises at least one seal between the closure plate and the container.

According to a second aspect, the invention may relate to a method for the additive manufacture of a component by complete or partial selective melting of a powder, employing the machine as set out hereinabove. According to the method, following manufacture of the component:

the container is moved with respect to the sleeve from a standby position into an operation position above the top opening of the sleeve, the support plate is moved along the vertical central axis by the actuating device as far as inside the container, the closure plate is moved translationally with respect to the sleeve to close the bottom opening of the container, or the container is moved translationally along the horizontal axis with respect to the sleeve on the closure plate in order to close the bottom opening of the container.

Possibly, after the bottom opening of the container has been closed by the closure plate, the container and the closure plate may be moved, together, into an extraction position outside the working chamber of the machine.

BRIEF DESCRIPTION OF THE DRAWINGS

Further features and advantages will become apparent in the light of the description of the preferred embodiments of the invention, accompanied by the figures, in which.

DETAILED DESCRIPTION

Figure 1:
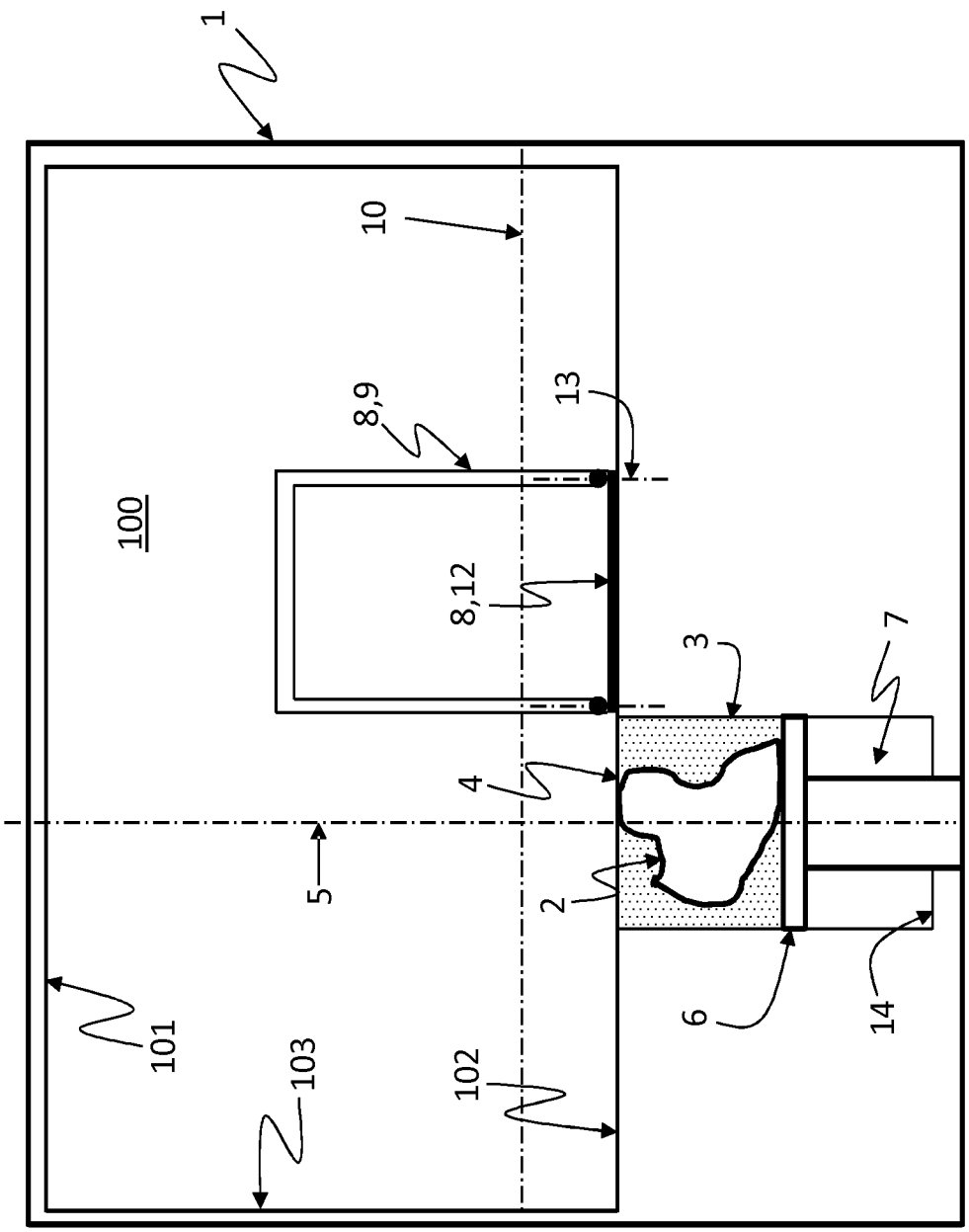
FIGS. 1 to 4 are schematic depictions of the inside of an additive manufacturing machine according to a first embodiment.
Figure 2:
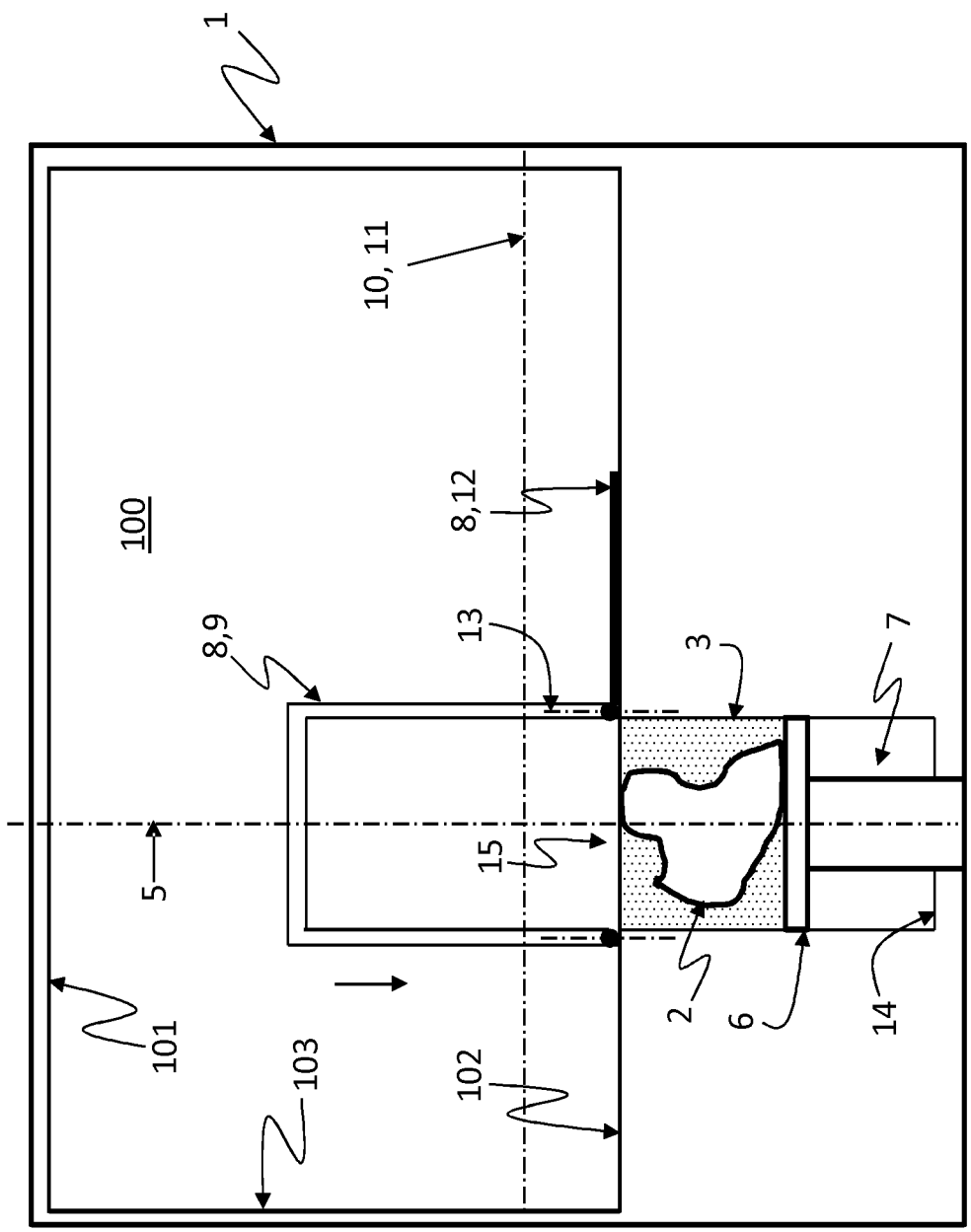

A machine 1 for the additive manufacture of a component 2 by complete or partial selective melting of a powdered material, is depicted in FIGS. 1 to 6. The material may notably be metallic or plastic.

The machine 1 notably comprises a manufacturing chamber 100, constituting a closed space with a controlled atmosphere. In particular, the chamber 100 is filled with a gas that is inert with respect to the material used, so as to limit corrosion. The manufacturing chamber 100 is delimited by a top wall 101, a bottom wall 102, and side walls 103. The bottom wall 102 forms a work surface, over which the powder is spread.

The machine 1 comprises a sleeve 3 comprising a top opening 4 coinciding with an opening in the work surface 102 and opening into the chamber 100. More specifically, the sleeve 3 extends along a vertical central axis 5 between the top opening 4, oriented upwards, and a bottom 14 which may or may not be open. The side wall of the sleeve 3 may thus serve to guide a component support plate 6.

In what follows, for the sake of clarity, the horizontal direction and the vertical direction correspond to the natural orientation of FIGS. 1 to 6. Likewise, the terms "top", "bottom", "lower", "upper" and variations thereof are to be understood with reference to the vertical direction in the figures.

The component support plate 6 is intended to accept the component 2 in the process of being manufactured. It is made to move vertically along the central axis 5 by an actuating device 7. The actuating device 7 comprises, for example, a piston to which the support plate 6 is fixed, directly or indirectly. For example, a heating device may be positioned between the support plate 6 and the piston so as to control the temperature of the plate 6. For preference, the attachment between the support plate 6 and the actuating device 7 is of the removable type. Thus, the support plate 6 can be withdrawn from the actuating device 7, for example in order to be taken out of the machine 1.

The machine 1 furthermore comprises a melting system, not depicted, which makes it possible for the grains of powder to melt and and fuse together. This is, for example, a laser system, directing a beam onto the powder inside the working chamber 100.

Thus, the component 2 is manufactured layer by layer by complete or partial melting of the powder. Each layer of powder is distributed and spread on the work surface 102 in succession, so as to cover the component support plate 6 at least in part, the plate 6 being lowered inside the sleeve 3 over a determined height between each of the layers.

Thus, when the component 2 is finished, it is situated completely inside the sleeve 3, between the top opening 4 and the bottom 14, on the support plate 6. Since not all of the powder in each layer is necessarily melted, the unmelted remaining powder surrounds the component 2 in the sleeve 3.

In order to extract the finished component 2 from the sleeve, the machine 1 further comprises a component 2 extraction system 8.

The extraction system 8 comprises at least one container 9, the dimensions of which are at least equivalent to those of the sleeve 3, so that the volume of the container 9 is at least equal to the volume of the sleeve 3. The container 9 comprises at least, and preferably only, one bottom opening 15, oriented downwards. The container 9 may for example have a cylindrical overall shape, with a square or circular cross section. The dimensions of the bottom opening 15 of the container 9 are greater than those of the component support plate 6, which can therefore pass through the bottom opening 15. For preference, the dimensions of the bottom opening 15 of the container 9 are greater than the dimensions of the top opening 4 of the sleeve 3, so that the container 9 can come to bear against the work surface 102, covering the top opening 4 of the sleeve 3.

The container 9 thus forms a receptacle for the finished component 2 and the unmelted powder.

The container 9 is mounted with the ability to move translationally in the machine 1 with respect to the sleeve 3 so as to adopt at least two positions:

a standby position, in which the container 9 is set away from the top opening 4 of the sleeve 3, so as to allow the beam to reach the powder that is to be melted;

an operation position, in which the container 9 is placed over the top opening 4 of the sleeve, the bottom opening 15 of the container 9 coinciding at least in part with the top opening 4 of the sleeve 3, so as to allow the finished component 2 to pass from the sleeve 3 into the container 9.

More specifically, when the container 9 is in the operation position, the component 2 can pass from the sleeve 3 into the container 9 by passing through the top opening 4 of the sleeve and the bottom opening 15 of the container 9 by moving the support plate 6 upwards using the actuating device 7.

The extraction system 8 additionally comprises a closure plate 12, allowing the bottom opening 15 of the container 9 to be closed again when the component 2 and the support plate 6 are inside. For this purpose, the closure plate 12 is able to move with respect to the container 9 along at least one horizontal axis so that it can slide under the container 9 and close the bottom opening 15 thereof once the component 2 and the support plate 6 are placed inside the container 9.

Thus, in order to achieve closure of the bottom opening 15 of the container 9, either the closure plate 12 remains fixed in the chamber 100, with respect to the sleeve 3, and the container 9 moves horizontally with respect to the closure plate 12, or the container 9 remains fixed with respect to the sleeve 3, and it is the closure plate 12 which moves horizontally with respect to the container 9.

Once the container 9 is closed by the closure plate 12, it can be moved again, together with the closure plate 12, into an extraction position in which it can be removed from the manufacturing chamber 100.

The extraction system 8 may additionally comprise a removable coupling device 13 coupling the closure plate 12 and the container 9. This can be any device that allows the closure plate 12 to be attached temporarily to the container 9. It may for example be a device with retractable studs, a clip-fastening device, or alternatively a suction-cup device.

Two examples of how to implement the extraction system 8 will now be described with reference to the two embodiments of the machine 1 set out in FIGS. 1 to 6.

According to a first embodiment (FIGS. 1 to 4), the container 9 moves translationally between a standby position and an operation position along an input axis 10, which is horizontal, which means to say perpendicular to the central axis 5 of the sleeve 3.

While the component 2 is in the process of being manufactured, the container 9 is kept in the standby position, away from the top opening 4 of the sleeve 3 in order to leave same uncovered and allow the laser beam to reach the powder in order to melt it. The closure plate 12 is then in a position likewise set away from the top opening 4 of the sleeve 3 as long as the component 2 is in the process of being manufactured. The closure plate 12 is positioned as close as possible to the work surface 102, with just enough clearance to allow the closure plate 12 to slide with respect to the work surface 102. For example, the container 9 in the standby position is positioned above the closure plate 12 in the initial position, the edges of its bottom opening 15 being in contact with the closure plate 12.

Once the component 2 is finished, the container 9 is initially moved into the chamber 100 along the input axis 10, the edges of the bottom opening 15 sliding over the closure plate 12 which remains fixed. Next, the container 9 is moved in the chamber 100 in a movement perpendicular to the input axis 10, namely parallel to the central axis 5 of the sleeve 3, so that the bottom opening 15 of the container 9 comes into register with the top opening 4 of the sleeve 3.

When the container 9 is in the operation position, the actuating device 7 is implemented in order to move the support plate 6 upwards, so that the assembly made up of the support plate 6, of the component 2 and of the powder surrounding it is transferred into the container 9. Since the edges of the bottom opening 15 of the container 9 are in contact with the work surface 102 around the top opening 4 of the sleeve 3, the powder cannot escape during the transfer because of the continuity between the top opening 4 of the sleeve 3 and the bottom opening 15 of the container 9.

Figure 3:
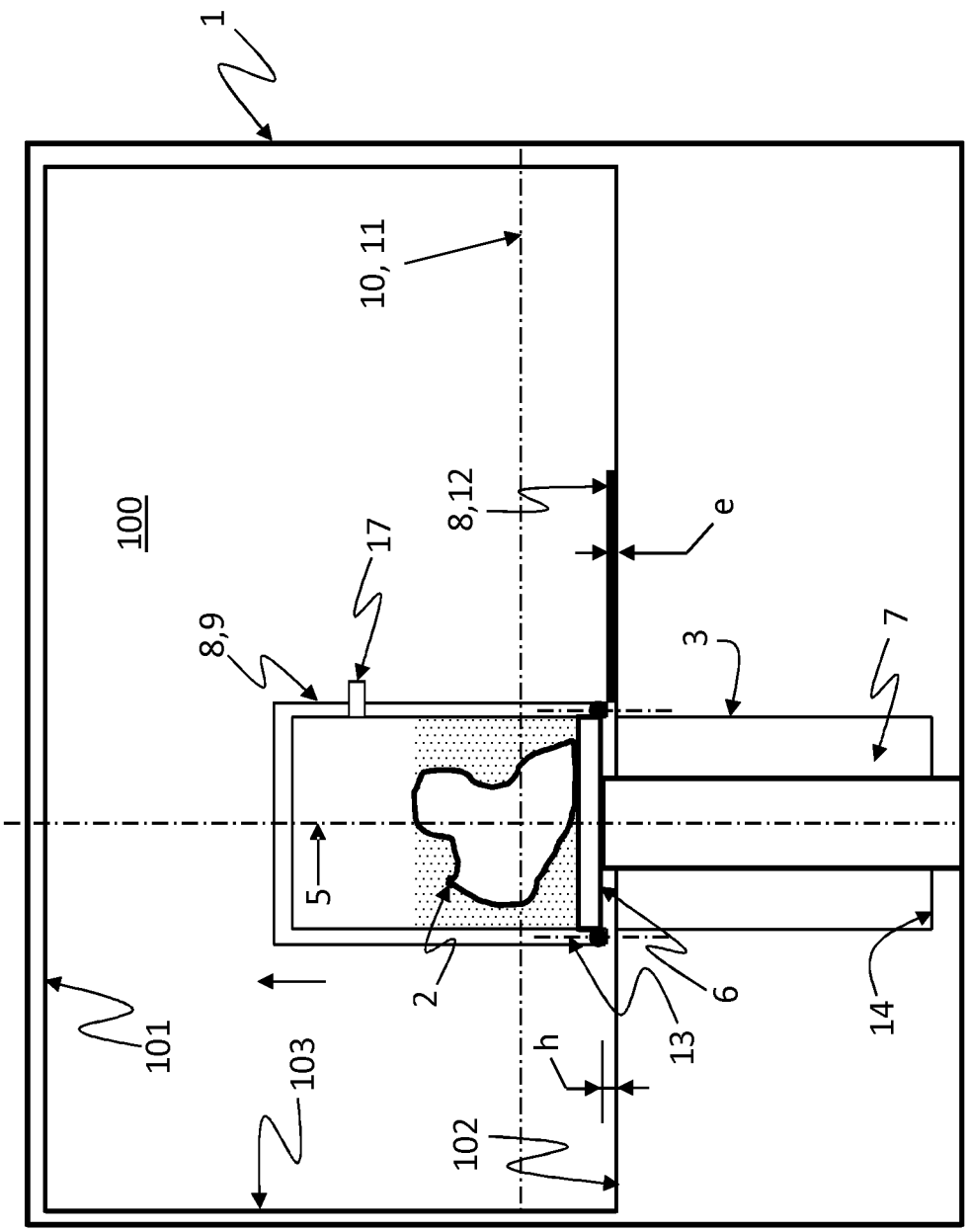
Figure 4:
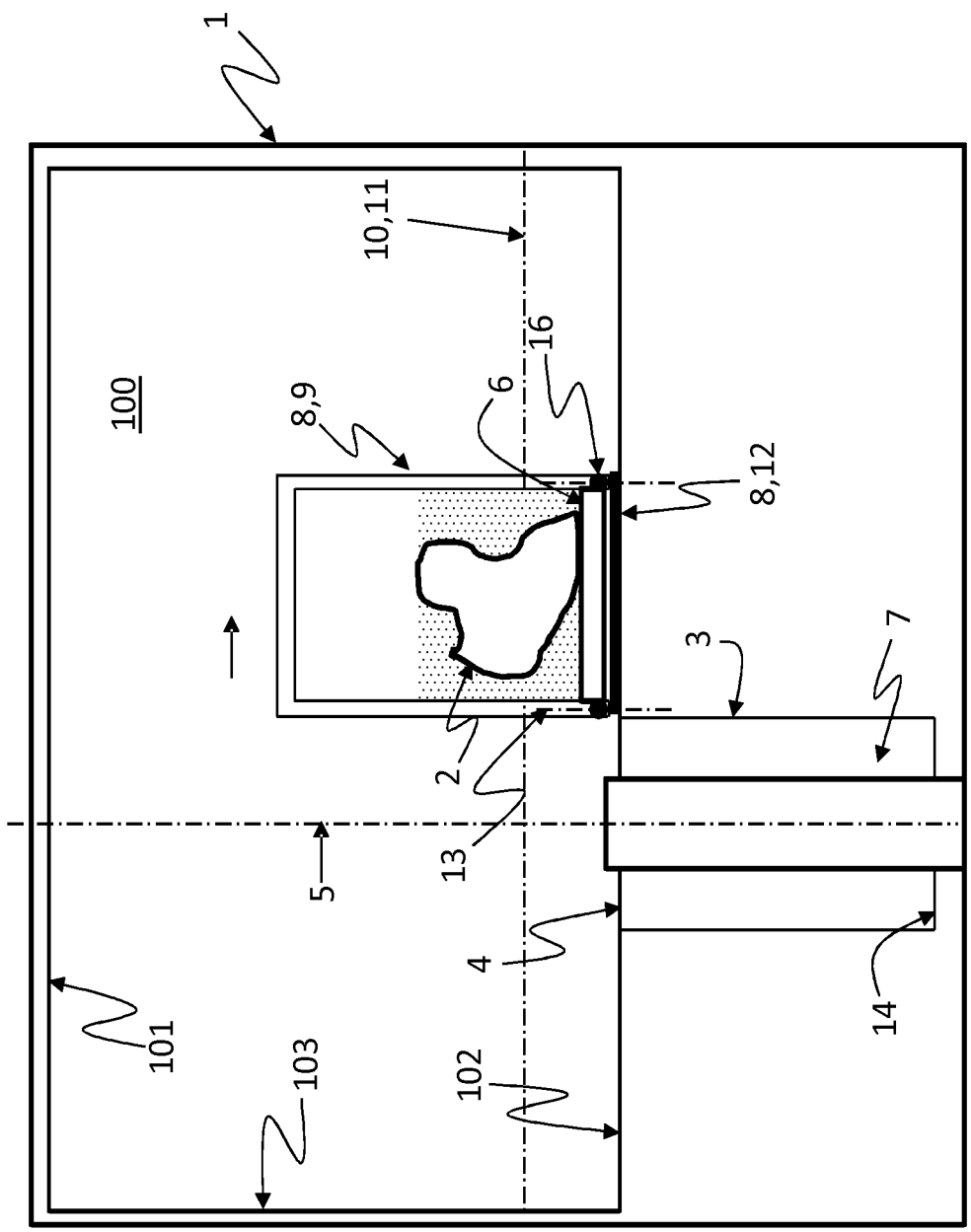
Figure 5:
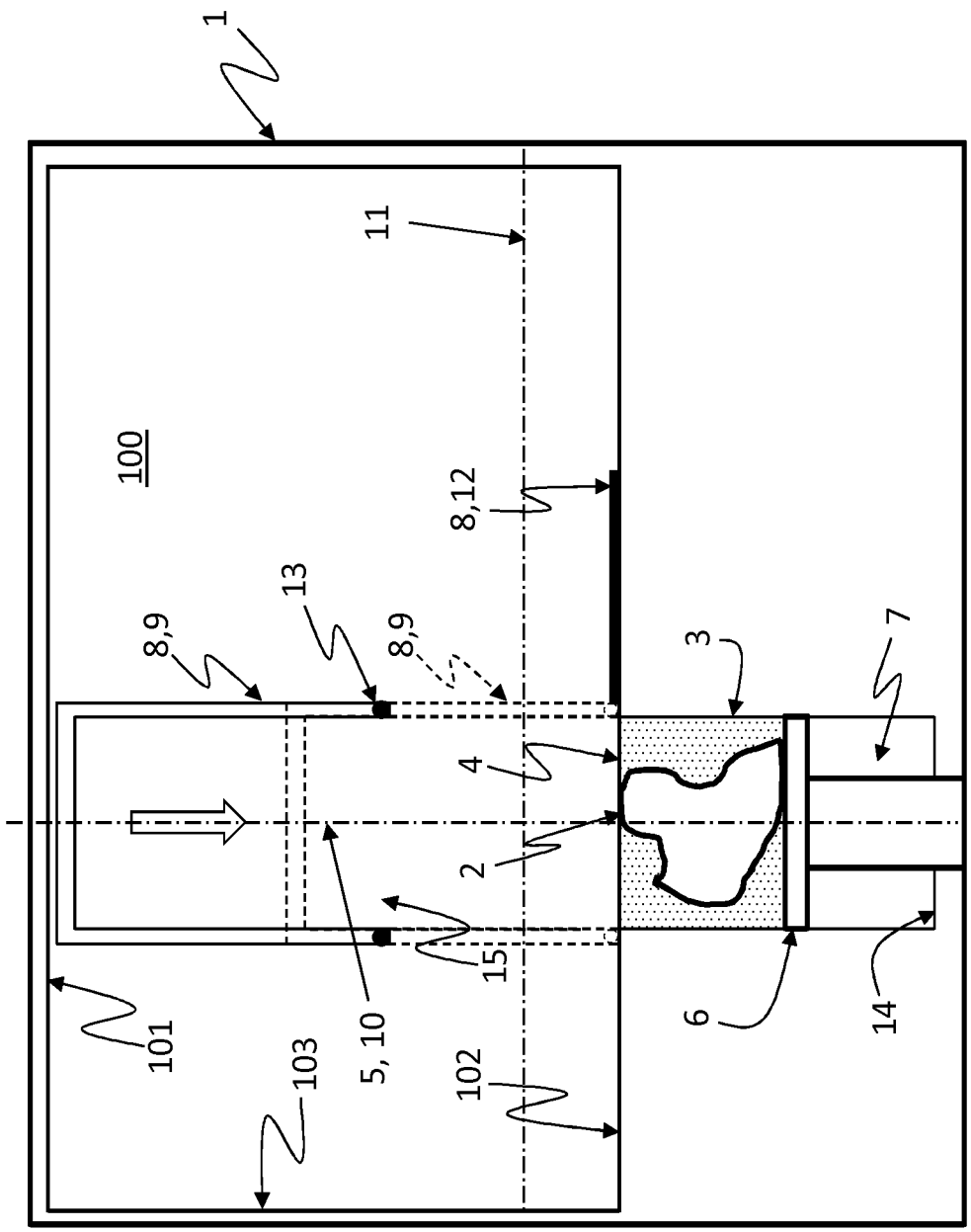
FIGS. 5 and 6 are schematic depictions of the inside of the additive manufacturing machine, and are similar to those of FIGS. 1 to 4, according to a second embodiment.

Once the assembly is inside the container 9, and as illustrated in FIG. 3, the container 9 and also the support plate 6 are moved in a movement parallel to the central axis 5 of the sleeve 3, and therefore vertically, by a height h that more or less corresponds to the thickness e of the closure plate 12.

Next, the container 9 is once again moved horizontally, along an axis which, according to the example given here, is the same input axis 10, the closure plate 12 still remaining immobile. Beforehand or at the same time, the support plate 6 disconnects from the piston of the actuating device 7 and then the support plate 6 is slid horizontally with respect to the piston of the actuating device 7, driven by the horizontal movement of the container 9. The container 9 then returns to a position that is the same as the standby position, carrying the support plate 6, the finished component 2 and the powder surrounding it, above the closure plate 12, so that the edges of the bottom opening 15 of the container 9 are in contact with the closure plate 12. The bottom opening 15 of the container 9 thus finds itself again closed by the closure plate 12.

The coupling device 13 is then actuated in order to secure the closure plate 12 and the container 9 together.

For preference, in parallel with the coupling device 13, a seal 16 is provided between the closure plate 12 and the container 9. This seal 16 prevents the powder from escaping from the chamber formed by the container 9 and the closure plate 12. Thus it is possible to extract the finished component 2 and the powder surrounding it while at the same time limiting health risks to operators working in the vicinity of the machine. In addition, by preventing the ingress of air into the chamber formed by the container 9 and the closure plate 12, the seal 16 makes it possible to avoid contamination and oxidation of the unmelted powder, thereby making this powder easier to reuse for the manufacture of further components.

The container 9 closed by the closure plate 12 and containing the finished component 2 can then be taken to a cleaning station for the removal of the unmelted powder. The cleaning station may be formed in a dedicated compartment of the machine 1, separate from the manufacturing chamber 100. In that case, the container 9 and the closure plate 12 are designed to be moved as far as the dedicated compartment. The cleaning station may be separate from the machine. In that case, the container 9 and the closure plate 12 are designed to be removable from the machine 1. The seal 16 between the container 9 and the plate 12 therefore makes it possible to prevent the powder from oxidizing as it is being transported out of the machine to the cleaning station. The powder can therefore be recovered and recycled.

However, for preference, in all instances, once the container 9 is closed by the closure plate 12, in order not to have to open the manufacturing chamber 100 with the inert atmosphere, the container 9 is moved into an extraction position outside of the manufacturing chamber 100. For example, the container moves translationally into the extraction position along an extraction axis 11, which may be horizontal or vertical, and notably which may be coincident with the input axis 10. An outlet hatch may be formed in the top wall 101 or on one of the side walls 103 of the chamber 100 in order to allow the container 9 to exit the manufacturing chamber 100 in an extraction position, for example in an air lock that allows an operator to gain access to the container 9 containing the finished component which may or may not have already been cleaned of powder.

Before beginning the manufacture of a new component, a new component support plate 6 is attached to the piston of the actuating device 7 in the manufacturing chamber 100.

According to a second embodiment (FIGS. 5 and 6), the container 9 moves translationally between a standby position and an operation position along an input axis 10, which is vertical, which means to say parallel to the central axis 5 of the sleeve 3, and in this instance according to the second embodiment set out here, coincident with the central axis 5.

Thus, the container 9 is placed in a standby position above the sleeve 3, set sufficiently away from the top opening 4 that it allows the laser beam to reach the powder. The closure plate 12 is then in an initial position, likewise set away from the opening 4 of the sleeve 3, which is similar, although not necessarily, to that of the previous embodiment. Next, the container 9 is moved along the input axis 10 into the operation position in which its bottom opening 15 is brought into register with the top opening 4 of the sleeve 3. As in the first embodiment, the edges of the bottom opening 15 of the container 9 are in contact with the work surface 102 around the top opening 4 of the sleeve 3, and the powder cannot escape during the transfer because of the continuity between the top opening 4 of the sleeve 3 and the bottom opening 15 of the container 9.

The actuating device 7 then raises the assembly formed by the support plate 6, the finished component 2 and the powder surrounding same inside the container 9.

Figure 6:
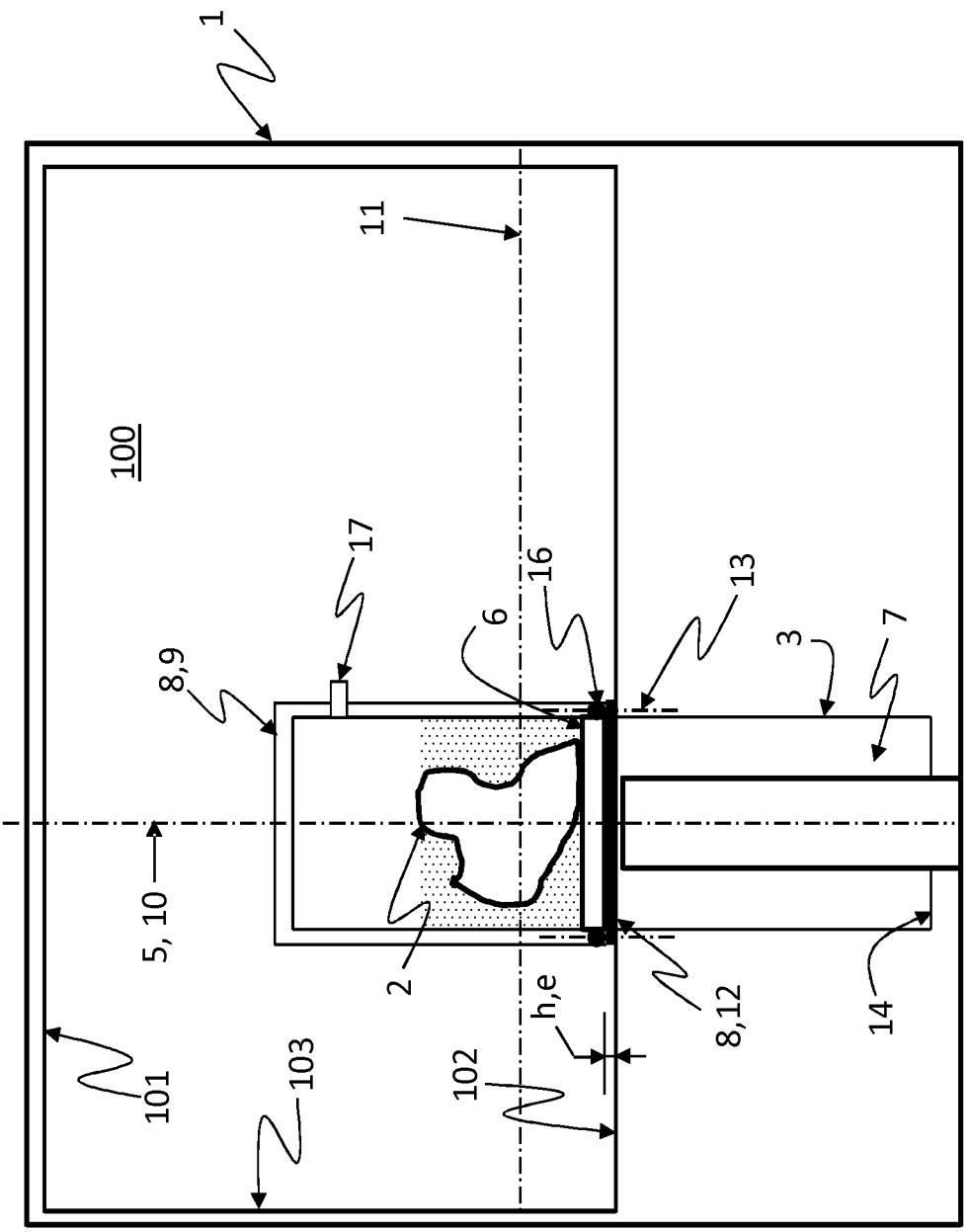

More specifically, the actuating device 7 raises, parallel to the central axis 5 of the sleeve 3, the assembly formed by the support plate 6, the finished component 2 and the powder surrounding same, up to a height h corresponding more or less to the thickness e of the closure plate 12. Immediately after this, the container 9 also moves up parallel to the central axis 5 of the sleeve up to a height h corresponding more or less to the thickness e of the closure plate 12, as can be seen in FIG. 6.

Thus, the closure plate 12 can be moved horizontally from its initial position so that it is interposed between the top opening 4 of the sleeve 3 and the bottom opening 15 of the container 9, in contact with the edges of the bottom opening 15 and under the support plate 6. At the same time as the closure plate 12 is moving, provision is made for the actuating device 7 to be disconnected from the support plate 6 so as to allow the closure plate 12 to completely cover the bottom opening 15 of the container 9.

The coupling device 13 is then actuated in order to connect the closure plate 12 and the container 9, and the seal 16 provides sealing between the closure plate 12 and the container 9.

As in the first embodiment, once the container 9 is closed by the closure plate 12, it can once again be moved into an extraction position in an airlock accessible to an operator, bypassing out of the manufacturing chamber 100 via an exit hatch. The air lock may form a powder cleaning station within the machine 1, so that an operator opening the air lock has direct access to the component cleaned of powder. The operator may also remove the container 9 closed by the closure plate 12 in order to take the component to a cleaning station away from the machine 1.

For example, the container 9 is moved into an extraction position by translational movement along an extraction axis 11, which may be coincident with the input axis 10, so that the container 9 is moved into an extraction position while being raised. However, the input axis 10 and the extraction axis 11 are not necessarily oriented in the same direction. The extraction axis 11 may thus be horizontal, not coinciding with the input axis 10.

Since the dimensions of the container 9 are greater than those of the support plate 6, the latter does not contribute to the closing of the container 9, thus making the support plate 6 easier to design. Specifically, the support plate 6 does not require any special feature.

Furthermore, when the support plate 6 is inserted into the container 9 with the component 2 and the non-solidified powder, the gas in the container can escape through the bottom opening 15, thus avoiding an increase in pressure in the container 9.

Alternatively, in the two embodiments set out, the container 9 may be equipped with a device 17, such as a valve or filter for example, allowing gas present in the container to pass and holding back the powder so as to prevent any leak of powder associated with the movement of gas as the volume of the component and of powder in the container increases.

In both of the embodiments set out, the container 9 is able to move along the input axis 10 and the extraction axis 11 which are rectilinear. They may, however, be curved, or made up of a plurality of rectilinear portions inclined relative to one another.

The invention claimed is:

1. A machine for the additive manufacture of a component by complete or partial selective melting of a powder, the machine comprising:
   a working chamber;
   a sleeve having a top opening which opens into the working chamber, and having a vertical central axis;
   a support plate to accept the component in the process of being manufactured;
   a device for actuating the translational movement of the support plate inside the sleeve along the vertical central axis of the sleeve; and
   a component extraction system comprising a container comprising at least one bottom opening towards the top opening of the sleeve, the container being mounted with the ability to move in the working chamber with respect to the sleeve between a standby position in which the container is set away from the opening of the sleeve and an operation position in which the bottom opening of the container at least partially coincides with the top opening of the sleeve, the support plate being moved by the actuating device from the sleeve to inside the container in the operation position,
   wherein the component extraction system further comprises at least one closure plate able to move with respect to the container in the working chamber along at least one horizontal axis in order to close the bottom opening of the container, the closure plate being separate from the support plate, and
   wherein the attachment between the support plate and the actuating device is removable.

2. The machine according to claim 1, wherein the container moves between a standby position and an operation position along an input axis parallel to the vertical central axis of the sleeve.

3. The machine according to claim 1, wherein the container moves between a standby position and an operation position along an input axis perpendicular to the vertical central axis of the sleeve.

4. The machine according to claim 1, wherein the container moves between an operation position and an extraction position in which the container is outside the working chamber.

5. The machine according to claim 1, wherein the actuating device comprises a piston, the support plate being mounted removably on the piston, the closure plate being interposed between the support plate and the piston to close the bottom opening of the container.

6. The machine according to claim 1, wherein the component extraction system comprises a removable coupling device coupling the closure plate and the container.

7. The machine according to claim 1, wherein the component extraction system comprises a seal between the closure plate and the container.

8. A method for the additive manufacture of a component by complete or partial selective melting of a powder comprising:
   employing the machine according to claim 1; and
   following manufacture of the component, moving the container with respect to the sleeve from a standby position into an operation position above the top opening of the sleeve;
   moving the support plate along the vertical central axis by the actuating device as far as inside the container; and
   moving the closure plate translationally with respect to the sleeve to close the bottom opening of the container.

9. A method for the additive manufacture of a component by complete or partial selective melting of a powder comprising:
   employing the machine according to claim 1; and
   following manufacture of the component, moving the container with respect to the sleeve from the standby position into the operation position above the top opening of the sleeve;
   moving the support plate along the vertical central axis by the actuating device as far as inside the container; and
   moving the container translationally along the horizontal axis with respect to the sleeve on the closure plate in order to close the bottom opening of the container.

10. The method according to claim 8, wherein, after the bottom opening of the container has been closed by the closure plate, the container and the closure plate are moved together into an extraction position outside the working chamber of the machine.

11. The method according to claim 9, wherein, after the bottom opening of the container has been closed by the closure plate, the container and the closure plate are moved together into an extraction position outside the working chamber of the machine.

* * * * *